United States Patent [19]
Pawlowski

[11] Patent Number: 5,845,320
[45] Date of Patent: Dec. 1, 1998

[54] CIRCUIT AND METHOD TO IMPLEMENT A LEAST RECENTLY USED CACHE SET REPLACEMENT TECHNIQUE

[75] Inventor: J. Thomas Pawlowski, Boise, Id.

[73] Assignee: Micron Technology, Inc., Boise, Id.

[21] Appl. No.: 638,819

[22] Filed: Apr. 29, 1996

[51] Int. Cl.$^6$ .................................................. G06F 12/12
[52] U.S. Cl. ........................................ 711/136; 711/128
[58] Field of Search ...................... 395/470, 471,
395/469, 465, 456, 452, 463, 461, 462,
858; 711/136, 128, 167

[56] References Cited

U.S. PATENT DOCUMENTS

| | | |
|---|---|---|
| 4,168,541 | 9/1979 | DeKarske . |
| 4,530,055 | 7/1985 | Hamstra et al. .......................... 711/136 |
| 4,607,331 | 8/1986 | Goodrich, Jr. et al. . |
| 4,811,203 | 3/1989 | Hamstra .................................. 711/142 |
| 5,125,085 | 6/1992 | Phillips . |
| 5,140,690 | 8/1992 | Hata et al. . |
| 5,222,224 | 6/1993 | Flynn et al. ............................. 711/144 |
| 5,325,504 | 6/1994 | Tipley et al. . |
| 5,325,511 | 6/1994 | Collins et al. . |
| 5,353,425 | 10/1994 | Malamy et al. . |
| 5,450,565 | 9/1995 | Nadir et al. . |
| 5,586,296 | 12/1996 | Bernstein et al. ....................... 711/138 |

Primary Examiner—Tod R. Swann
Assistant Examiner—J. Peikari
Attorney, Agent, or Firm—Thorp, Reed & Armstrong

[57] ABSTRACT

A circuit for controlling which set of a four-way set associated cache memory receives data for storage includes a memory array for storing six bits of information representative of the relative use of the four sets within the cache memory. Least recently used (LRU) update logic operates in conjunction with bit write drivers to generate and write the six bits of information to the memory array in a single access cycle. Replace logic reads the stored information from the memory means and produces output signals therefrom. The output signals are used to control into which of the four sets data is written. Error detection and fault tolerant embodiments are also disclosed as is a method of controlling which set of a four-way set associative cache memory receives data for storage.

15 Claims, 8 Drawing Sheets

CIRCUIT AND METHOD TO IMPLEMENT A LEAST RECENTLY USED CACHE SET REPLACEMENT TECHNIQUE

BACKGROUND OF THE INVENTION

1. Field of the Invention

The present invention is directed generally to memory subsystems used with microprocessors and, more particularly, to cache replacement techniques.

2. Description of the Background

The speed at which microprocessors operate has been continually improved such that the point has now been reached where the microprocessor's ability to retrieve instructions and data from memory has become a limiting factor on the speed at which the microprocessor can operate. The complexity of software is related to the amount of memory required, and as software routines become more complicated, main memory requirements have ballooned. As memory becomes larger, access times become longer and the microprocessor is inhibited from operating at, or sometimes even near, its maximum speed. To alleviate that problem, cache memory is provided.

Cache memory refers to a small volume of high-speed memory that can be easily accessed by the microprocessor. Whatever information that the microprocessor needs, if it is found in the cache memory, that information can be quickly accessed thereby allowing the microprocessor to operate at or near its maximum speed. However, because the cache memory is of limited size, and is typically much smaller than the main memory, the cache memory must be managed in a way to ensure that the information which the microprocessor needs will likely be found in the cache memory.

One way in which cache memory is managed is directed to the manner in which the data stored in the cache memory is related to the data stored in the main memory. That relationship is referred to as mapping, and various techniques are known for mapping blocks of main memory into cache memory. Typical forms of mapping include direct, two-way mapping, and four-way mapping. In a direct mapping system, each block of main memory can be represented in only one particular cache memory location. In a set associative system, each block of main memory can be placed only into cache memory lines having the same set number. The number of sets associated with each cache memory location determines the number of ways. In a fully associative cache system, any block of main memory can be represented in any cache memory line.

Another aspect of managing cache memory comes into play when the cache memory becomes full and a new block of data from the main memory needs to be stored in the cache memory. Under those circumstances, some mechanism must be provided to determine which data in the cache memory is to be discarded and replaced by the new data from the main memory. To make that determination, cache controllers are provided.

It is the function of the cache controller to determine which data in the cache memory is to be discarded by being overwritten by the new data. That function may best be provided by identifying the data in the cache memory which is least likely to be needed so that it is that data that is overwritten.

The performance of a cache memory is directly related to the ability of the cache controller to identify the information which is least likely to be needed by the microprocessor. The performance of cache memory is frequently measured in terms of a "hit ratio". That is, when data required by the microprocessor is found in the cache memory, a "hit" results. If the data required by the microprocessor is not found in the cache memory, a "miss" results. The ratio of the number of hits divided by the combination of the number of hits plus the number of misses provides a hit ratio. It has been suggested that a hit ratio of 90% or higher is needed to justify the additional time needed to determine if the requested data is in the cache memory. Thus, the cache controller performs an extremely vital function.

Cache controllers typically implement some type of replacement heuristic such as round-robin, first in first out, or least recently used (LRU). The round-robin heuristic simply replaces cache memory lines in a sequential order. The first in first out heuristic determines which of the data currently residing in the cache was the first one saved, and that is the data which is overwritten. The LRU heuristic attempts to identify which data has been the least recently used, and that is the data which is overwritten. There are several methods for implementing LRU techniques. For example, See U.S. Pat. No. 5,125,085 entitled "Least Recently Used Replacement Level Generating Apparatus And Method", U.S. Pat. No. 5,325,511 entitled "True Least Recently Used Replacement Method And Apparatus", and U.S. Pat. No. 5,140,690 entitled "Least-Recently Used Circuit".

Multiple-way, set-associative caches are generally accepted as the highest performance caches. There is a continuing search for better set-replacement algorithms, particularly better schemes of implementing LRU methods, for such caches because the replacement algorithm has a significant bearing on how well the cache performs. Unfortunately, many of the set-replacement algorithms are either difficult to implement or do not find the least recently used set 100% of the time. For example, an eight-bit LRU method has been devised in which four groups of two bits represent set numbers. The first group represents the most recently used set, and the fourth group represents the least recently used set. Assume that a current state may be represented as follows: 00 (set 0) 11 (set 1) 10 (set 2) and 01 (set 3) indicating that set 0 was the most recently used set, followed by set 3, then set 2, and finally set 1, which was the least recently used. If the next access is to set 2, the new state must become: 10 00 11 01. To accomplish such an update, a read-modify-write cycle must be performed on those bits. That requires a minimum of two memory cycles per cache hit. Thus, the LRU memory array will be the limiting factor in the cache access cycle because all other elements require only one access cycle.

In another example, a three-bit LRU method involves using the first bit to indicate which pair of sets was most recently used. The second bit indicates which set in the first pair was most recently used. The third bit indicates which set in the second pair was most recently used. That scheme has the advantage of only requiring one write per cache hit. However, one third of the time, instead of indicating the least recently used set, it indicates the second least recently used set. That is, if the order of recency of use is 0 3 2 1, then two thirds of the time, the scheme will indicate that set 1 should be replaced but one third of the time set 2 will be indicated.

Another problem associated with the LRU logic of the prior art, for example the aforementioned U.S. Pat. No. 5,140,690, is that an error in the system is catastrophic. The six variables have sixty four states. Forty of those states are invalid, and the logic only inherently covers eight of those forty states. That means that if there is an error, most of the time no set will be designated for replacement. The probable outcome is that data in the cache will be overwritten because no lines are ejected. A single bit error in the LRU can generate any of the sixty four possible states.

Thus, the need exists for an LRU method which is easy to implement, requires only one access cycle, provides a true least recently used indication, and is fault tolerant.

SUMMARY OF THE PRESENT INVENTION

In its broadest form, the present invention is directed to a circuit having least recently used (LRU) logic to identify which cache memory set of a four-way set associative cache memory is the least recently used, and set replace logic to allow data to be written to the least recently used set. The present invention is comprised of a memory for storing six bits of information representative of the relative use of the four sets within the cache memory. The LRU logic is provided for generating and writing six bits of information, in a single access cycle, to the memory. The six bits of information indicate the relative use of the four sets within the cache memory. The set replace logic reads the six bits of information from the memory and produces output signals therefrom. The output signals indicate into which of the four sets data is to be written.

The present invention is also directed to a method of controlling which set of a four-way set associative cache memory receives data for storage. The method is comprised of the steps of generating, in a single access cycle, six bits of information representative of the relative use of the four sets. The information is stored in a single access cycle within a memory array. The information is read from the memory array and output signals are produced from the read information. The output signals indicate into which of the four sets data is to be written.

The present invention is preferably implemented on a chip carrying a memory circuit. The present invention provides the advantage of correctly identifying, one hundred percent of the time, the least recently used set while requiring only six bits of information. The circuit operates within a single access cycle so that the circuit of the present invention does not compromise the speed of operation of the cache memory. The present invention may be implemented using either an error detection and compensation or a fault tolerant philosophy. Those advantages and benefits, and others, will become apparent from reading the Detailed Description of the Preferred Embodiments hereinbelow.

BRIEF DESCRIPTION OF THE DRAWINGS

For the present invention to be clearly understood and readily practiced, the present invention will be described in conjunction with the following figures wherein.

DETAILED DESCRIPTION OF THE PREFERRED EMBODIMENTS

Figure 1:
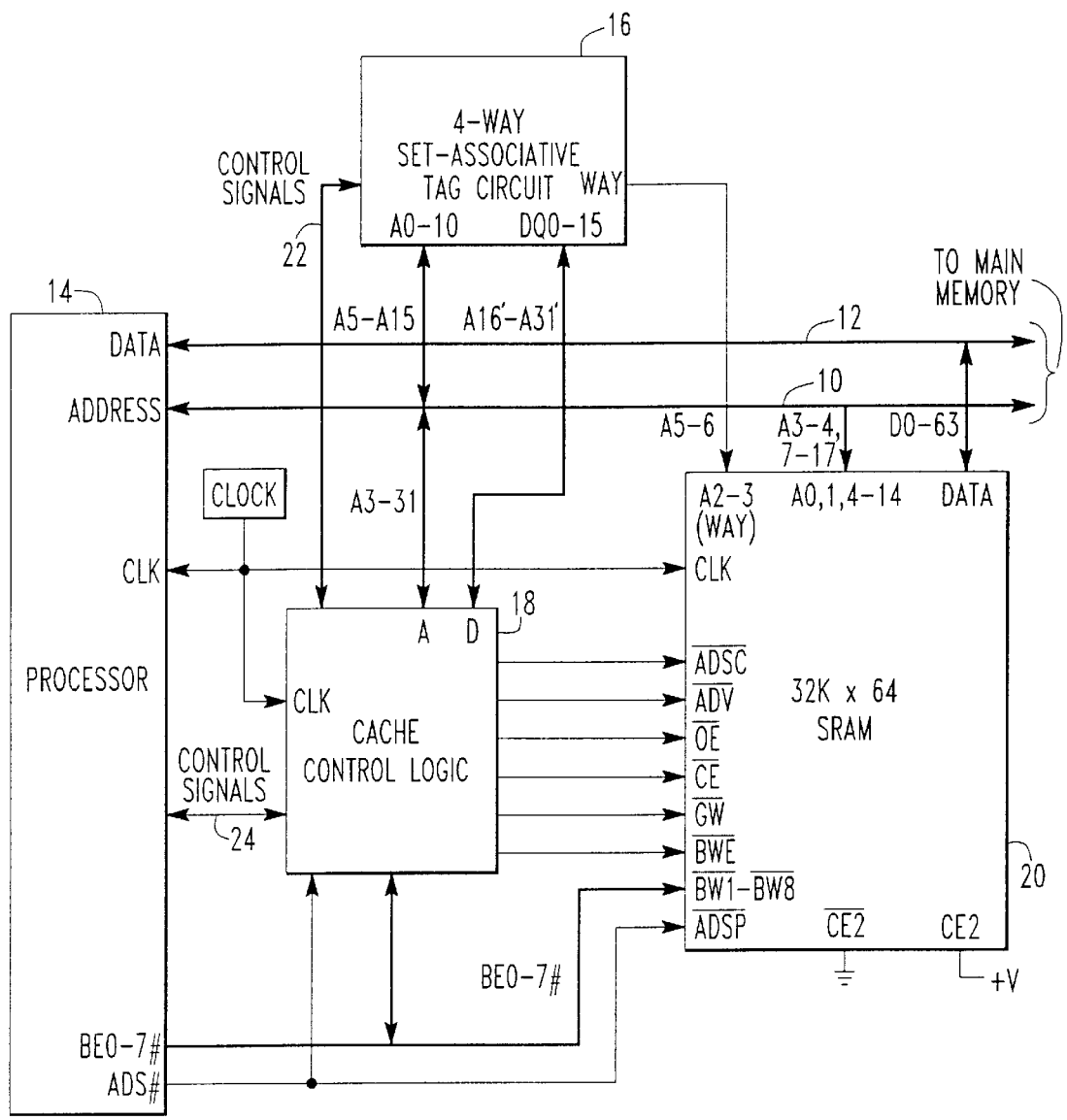
FIG. 1 is a block diagram illustrating a system architecture in which the present invention may be employed.

FIG. 1 is a block diagram illustrating a system architecture in which the present invention may be employed. In FIG. 1, an address bus 10 and a data bus 12 interconnect a microprocessor 14 with a four-way, set-associative, tag circuit 16 constructed according to the teachings of the present invention, cache control logic 18, and a data cache 20 in a standard manner. Cache control logic 18 provides control signals 22 such as READ, WRITE, INQUIRE, and STATUS WRITE in a known manner, and receives control signals 24 such as HIT. One of the purposes of the circuit 16 illustrated in FIG. 1 is to improve the performance of the cache subsystem illustrated in FIG. 1.

Figure 2:
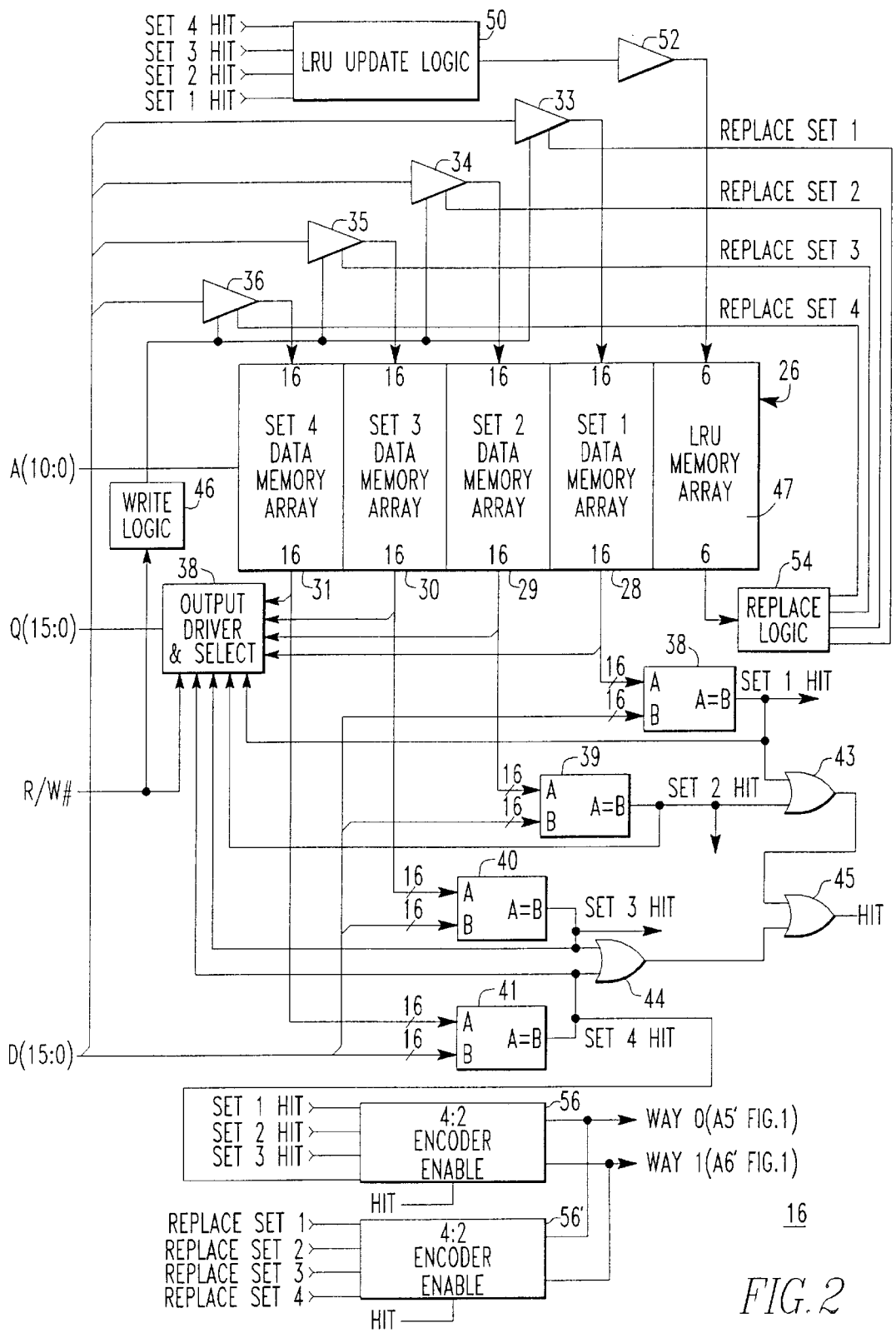
FIG. 2 is a block diagram illustrating a four-way, set associative, cache tag circuit constructed according to the teachings of the present invention.

Turning to FIG. 2, that figure is a block diagram illustrating relevant portions of the four-way, set associative, cache tag circuit 16. A tag cache 26 is responsive to address lines A[10:0] in a conventional manner to access a particular location in tag cache 26. The tag cache 26 is also responsive to data lines D[15:0] which carry information commonly referred to as the tag field.

The tag cache 26 is divided into a first set 28 (set 1), a second set 29 (set 2), a third set 30 (set 3), and a fourth set 31 (set 4) for storing, under a single address location defined by the address lines A[10:0], first, second, third, and fourth tag fields defined by lines D[15:0] and representative of first, second, third, and fourth data, respectively.

The tag field defined by lines D[15:0] is written to set 1 by a write driver 33, to set 2 by a write driver 34, to set 3 by a write driver 35, and to set 4 by a write driver 36.

Tag circuit 16 also includes an output driver and select circuit 38 which is of conventional construction which determines which data set's output should be placed on lines Q[15:0]. The output driver and select circuit 38 is of conventional construction and operation and is therefore not described herein in further detail.

Tag circuit 16 also includes write logic 46 which controls write drivers 33, 34, 35, and 36 in a conventional manner. Accordingly, no further details of the write logic 46 are provided herein.

The tag circuit 16 includes four comparators 38, 39, 40, and 41. Each of the comparators 38 through 41 receives the tag field defined by lines D[15:0]. Comparator 38 also receives the tag field stored in set 1. Comparator 39 receives the tag field stored in set 2. The comparator 40 receives the tag field stored in set 3. The comparator 41 receives the tag field stored in set 4. Whenever a tag field output by one of the sets matches the tag field defined on lines D[15:0] a hit results as shown by the signals set 1 hit, set 2 hit, set 3 hit, and set 4 hit. A set 1 hit indicates that the tag field defined on lines D[15:0] is found in set 1 and, thus, the information sought by the microprocessor may be found in the cache memory 20. The cache hit signals are combined by logic gates 43, 44, and 45 as shown in FIG. 2 to produce a HIT signal indicative of the data being available in the cache memory 20 associated with tag cache 26.

Part of the tag cache 26 is an LRU memory array 47. The LRU memory array 47 could, alternatively, be a separate memory array. The purpose of LRU memory array 47 is to store six bits of information representative of the relative use of data sets 1, 2, 3, and 4. The six bits may be designated as bits "a", "b", "c", "d", "e", and "f" with the following value assigned to each bit:

| bit | value | meaning |
|---|---|---|
| a | 0 | set 1 is more recently used than set 2 |
| b | 0 | set 1 is more recently used than set 3 |
| c | 0 | set 1 is more recently used than set 4 |
| d | 0 | set 2 is more recently used than set 3 |
| e | 0 | set 2 is more recently used than set 4 |
| f | 0 | set 3 is more recently used than set 4 |

Accordingly, the LRU memory array 47 is six bits wide and $2^n$ bits deep, where n is the number of cache lines.

The tag circuit 16 also includes LRU update logic 50 which receives the signals set 1 hit, set 2 hit, set 3 hit, and set 4 hit. Based on the set hit signals, the LRU update logic 50 assigns values to the bits a through f to thereby identify which cache memory set is the least recently used. Bit write drivers 52 are then operative to write the value of the six bits to the LRU memory array 47. Only three of the six bit write drivers are active in any given cycle.

A replace logic 54 reads the six bits from the LRU memory array 47 and produces one of four possible output signals therefrom: a replace set 1 signal used to control write driver 33, a replace set 2 signal used to control write driver 34, a replace set 3 signal used to control write driver 35, and a replace set 4 signal used to control write driver 36.

In operation, the write logic 46 provides instructions to write data to the appropriate set selected by the replace logic 54 when a hit is detected. Simultaneously, the LRU update logic 50 generates the necessary bit values which are written by bit write drivers 52 to the LRU memory array 47, as will be discussed in greater detail hereinbelow in conjunction with FIG. 3. If there is a hit, at a minimum, three of the six bits will need to be changed. If there is no hit, no operation of the LRU update logic 50 takes place. Instead, an encoder 56, 56', which receives the set 1 hit, set 2 hit, set 3 hit, set 4 hit, replace set 1, replace set 2, replace set 3, and replace set 4 signals, outputs two WAY bits in preparation for the microprocessor 14 to read a set, and then redo the write to that same set as is known art. The logic for generating the two WAY bits is conventional and does not form a feature of the present invention.

Figure 3:
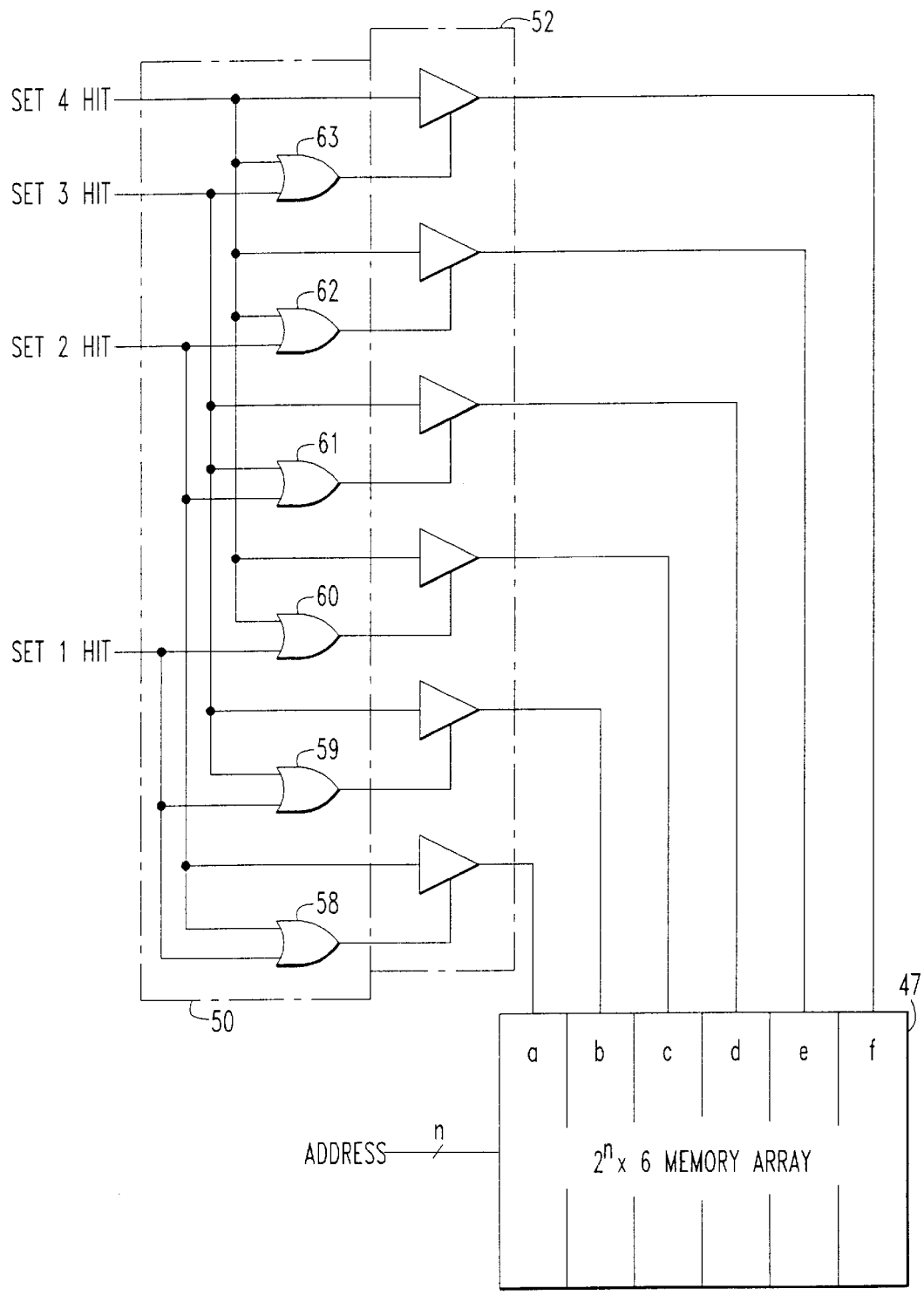
FIG. 3 is a block diagram illustrating the memory array and LRU update logic of the present invention.

Turning now to FIG. 3, the LRU update logic 50 is illustrated in conjunction with bit write drivers 52 and LRU memory array 47. The LRU update logic 50 is comprised of a gate 58 which cooperates with a bit write driver to write the bit "a" whenever there is a hit in either set 1 or set 2. A logic gate 59 cooperates with a bit write driver to write the bit "b" whenever there is a hit in either set 1 or set 3. A logic gate 60 cooperates with a bit write driver to write bit "c" whenever there is a hit in either set 1 or set 4. A logic gate 61 cooperates with a bit write driver to write bit "d" whenever there is a hit in either set 2 or set 3. A logic gate 62 cooperates with a bit write driver to write bit "e" whenever there is a hit in either set 2 or set 4. A logic gate 63 cooperates with a bit write driver to write bit "f" whenever there is a hit in either set 3 or set 4. That information may be expressed in the following form:
write_enable_a=set_1_hit or set_2_hit
write_enable_b=set_1_hit or set_3_hit
write_enable_c=set_1_hit or set_4_hit
write_enable_d=set_2_hit or set_3_hit
write_enable_e=set_2_hit or set_4_hit
write_enable_f=set_3_hit or set_4_hit Relying on the fact that bits a–f are only written under the above conditions, the logic can be simplified to the following to generate the data needed to be written:
a=set_2_hit
b=set_3_hit
c=set_4_hit
d=set_3_hit
e=set_4_hit
f=set_4_hit In FIG. 3, it is seen that all of the logic gates 58 through 63 are equally loaded with two signals being input to each of the gates. That balanced load and the minimum gate implementation optimizes the speed of determining which set is the least recently used. The LRU update logic 50 and bit write drivers 52 generate and write, respectively, the six bits to the LRU memory array 47 in a single access cycle so that the speed of the cache subsystem is not compromised. Note that the term "generate" as used herein is intended to include those bits that remain unchanged as well as those bits that change.

Figure 4:
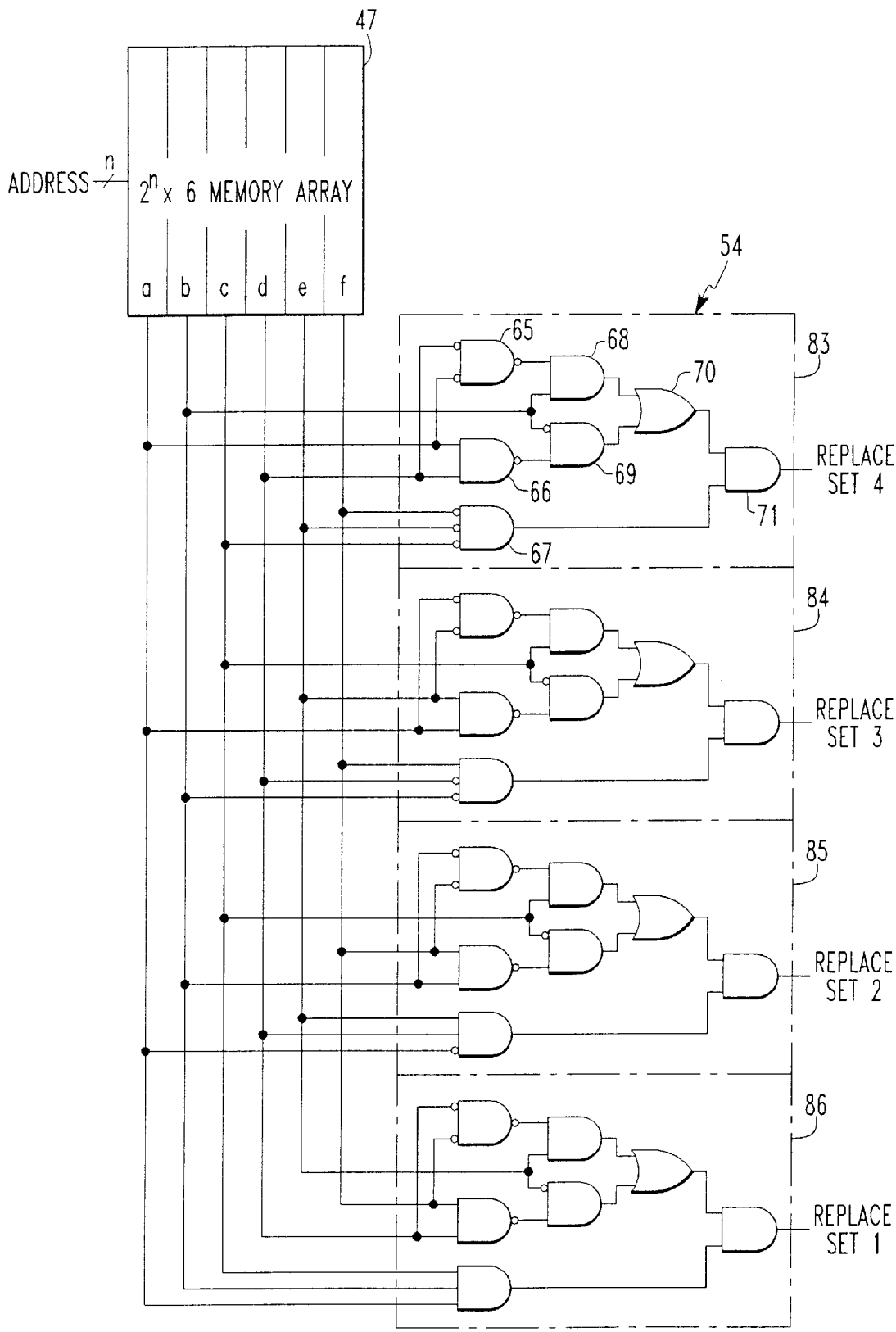
FIG. 4 is a block diagram illustrating the memory array and the non-fault tolerant set replace logic of the present invention.

Another important aspect of the present invention, the replace logic 54, is illustrated in FIG. 4 together with the LRU memory array 47. The replace logic 54 is comprised of four modules. Module 83 produces the replace set 4 signal, module 84 produces the replace set 3 signal, module 85 produces the replace set 2 signal, and module 86 produces the replace set 1 signal. Because each of the modules is identical, only module 83 will be described in detail.

To produce the replace set 4 signal, a NAND gate 65 receives the inverse of bits "a" and "d", a NAND gate 66 receives the bits "a" and "d", and a NAND gate 67 receives the inverse of the bits "c", "e", and "f". The output of gate 65 is input to an AND gate 68 which also receives bit "b". The output of gate 66 is input to an AND gate 69 which also receives the inverse of bit "b". The output of gate 68 and the output of gate 69 are input to an OR gate 70. An AND gate 71 produces the replace set 4 signal from the outputs of gates 70 and 67. The gates 65 through 71 combine the six bits to produce a signal indicating that set 4 is the least recently used set. The replace set 4 signal is used to control the operation of write driver 36. Modules 84, 85, 86 of the replace logic circuit 54 operate in a similar manner to produce the replace set 3 signal, the replace set 2 signal, and the replace set 1 signal, respectively, as shown in FIG. 4.

Figure 5:
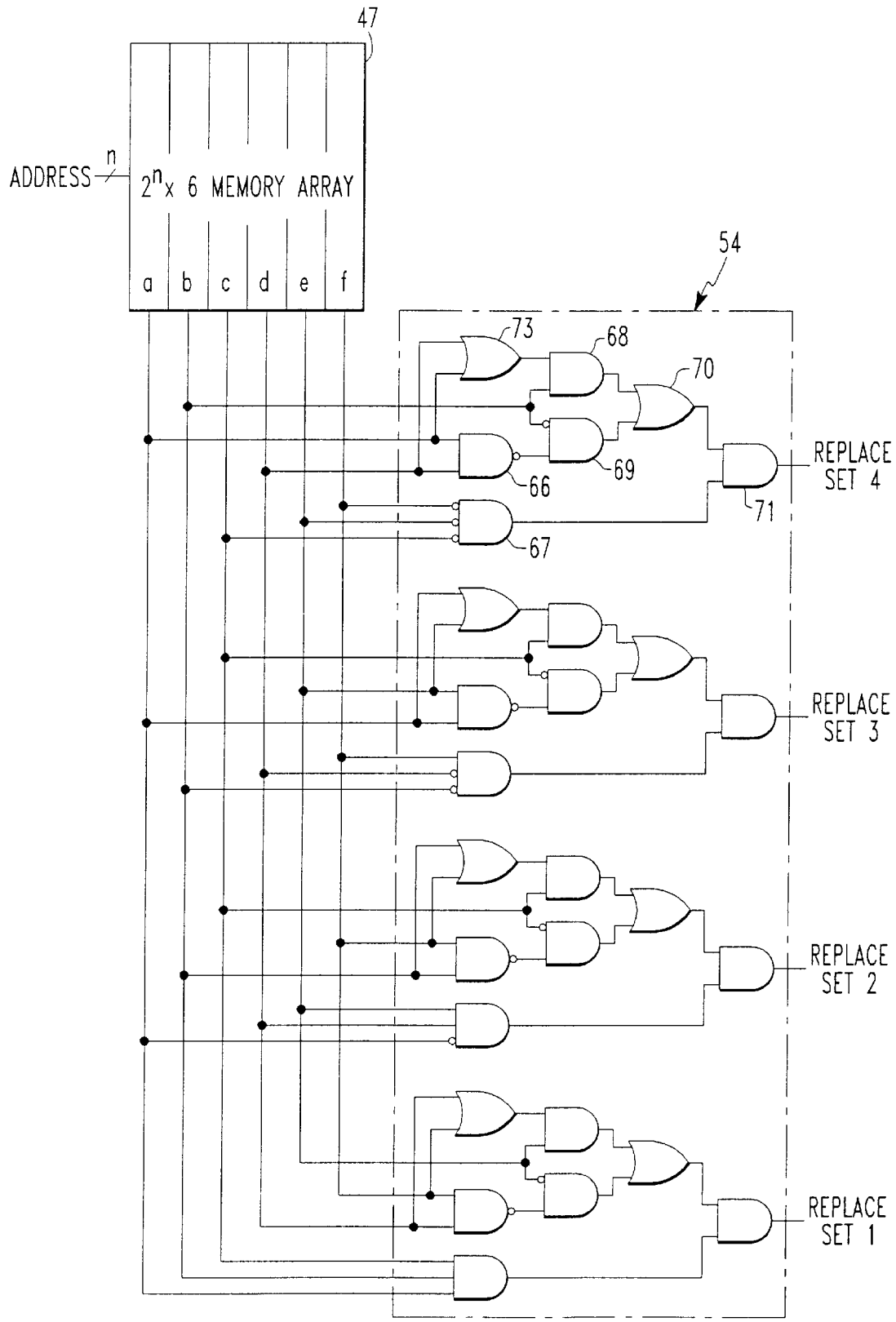
FIG. 5 and FIG. 6 are block diagrams illustrating alternative embodiments for the set replace logic of the present invention.

In FIG. 5, an alternative embodiment for the construction of replace logic 54 is illustrated. In FIG. 5, it is seen that the gates used to generate the replace set 4 signal are the same except that NAND gate 65 is replaced by an OR gate 73. The purpose and operation of the replace logic 54 illustrated in FIG. 5 is the same as that illustrated in FIG. 4.

Figure 6:
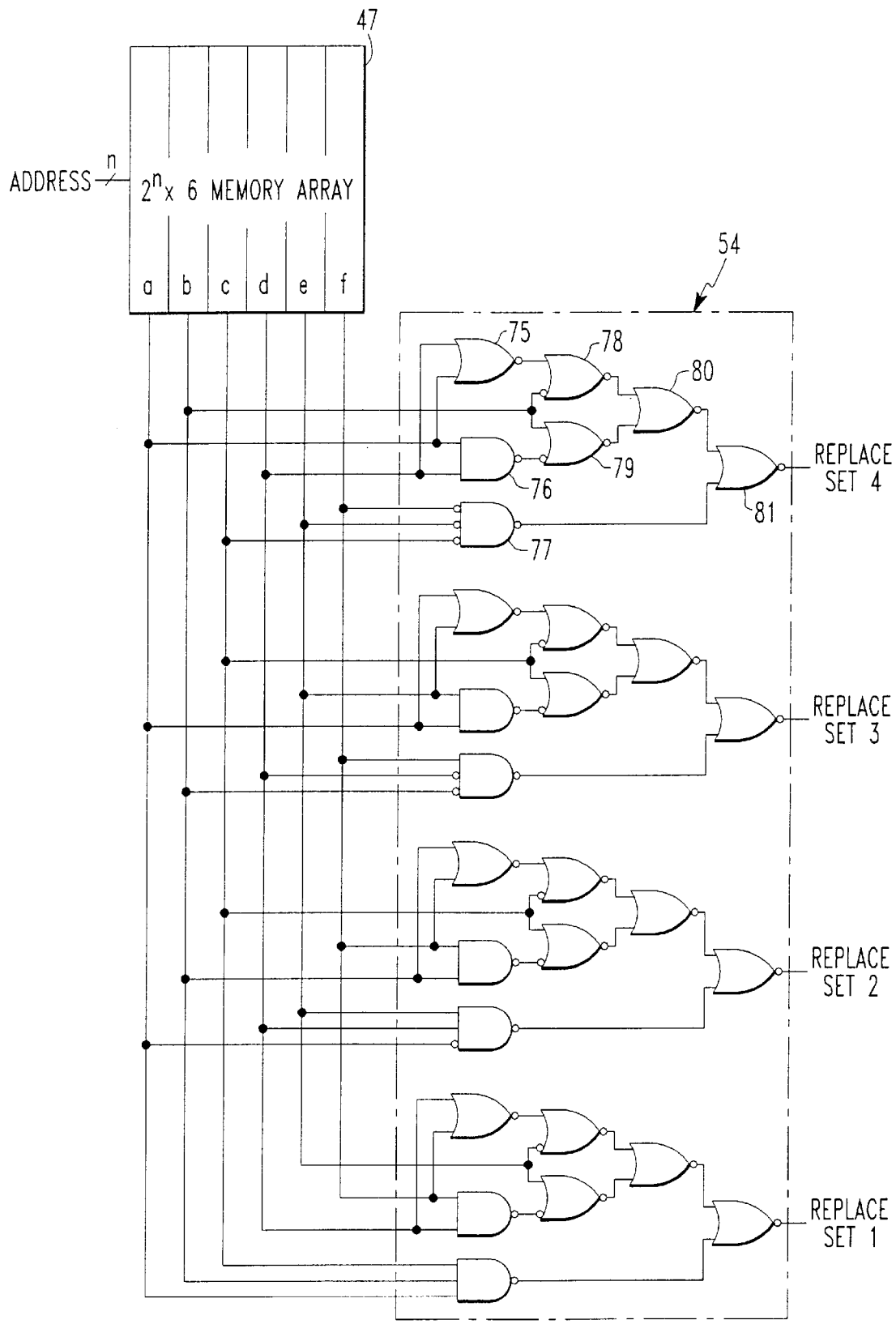

In FIG. 6, another alternative embodiment for the replace logic 54 is shown. The replace 4 set signal is produced by a NOR gate 75 which receives bits "a" and "d", a NAND gate 76 which receives bits "a" and "d", and a NAND gate 77 which receives the inverse of bits "c", "e", and "f". A NOR gate 78 is responsive to the output of gate 75 and the inverse of bit "b". A NOR gate 79 is responsive to bit "b" and the output of gate 76. A NOR gate 80 is responsive to the output of gates 78 and 79. A NOR gate 81 produces replace set 4 signal in response to the outputs of gates 80 and 77. The function and purpose of the replace logic 54 illustrated in FIG. 6 is the same as that for the replace logic illustrated in FIG. 4.

Figure 7:
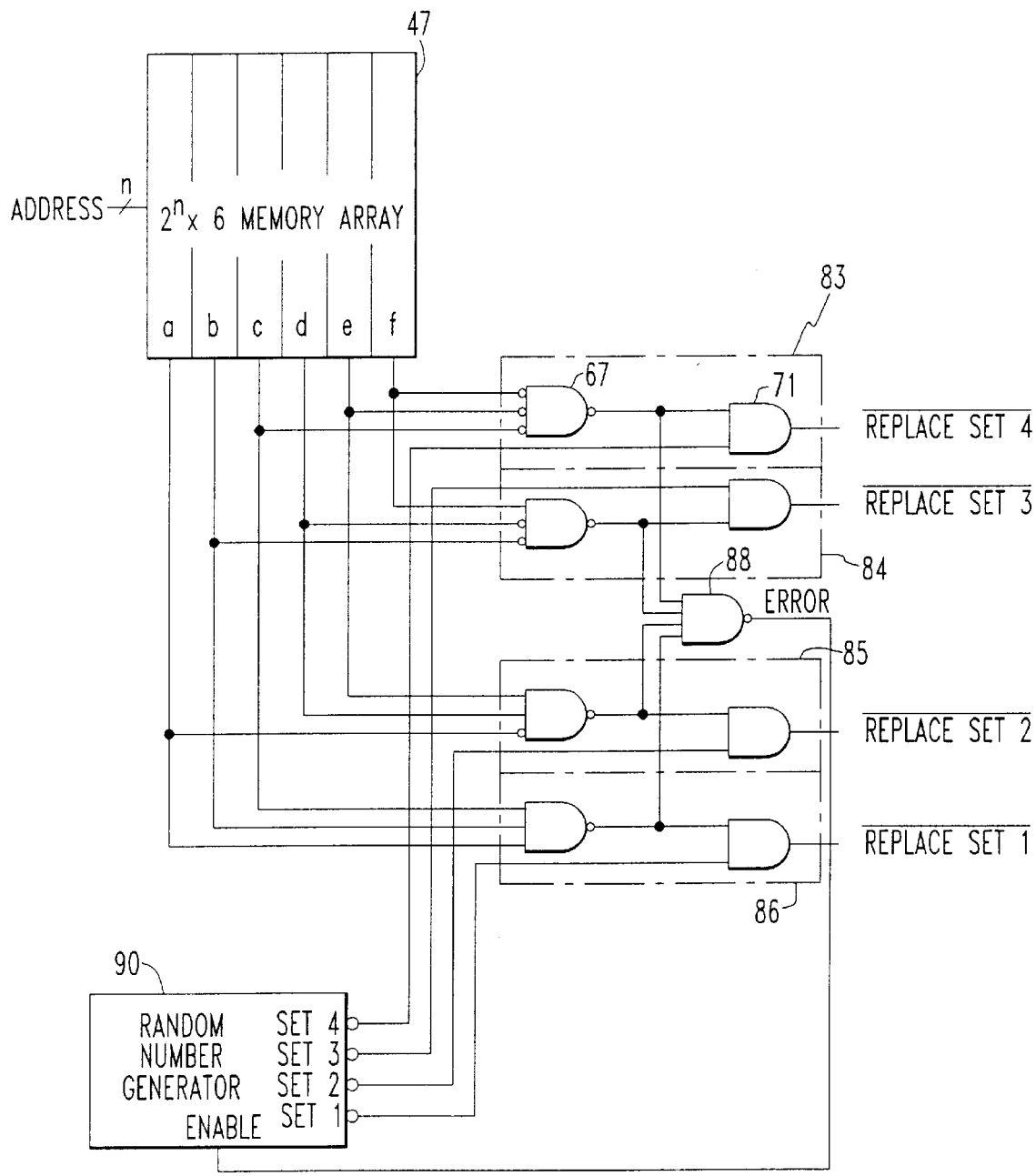
FIG. 7 is a block diagram illustrating an alternative embodiment for the set replace logic of the present invention and incorporating error detection and random replacement upon detection.
Figure 8A:
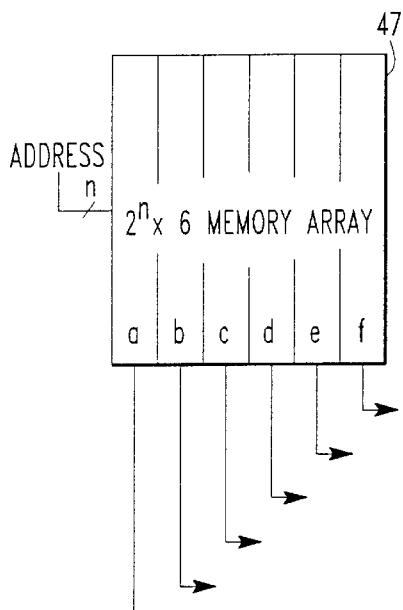
FIGS. 8A, 8B, 8C, 8D and 8E are a block diagram illustrating an alternative embodiment for the set replace logic of the present invention implemented in a fault tolerant manner.
Figure 8C:
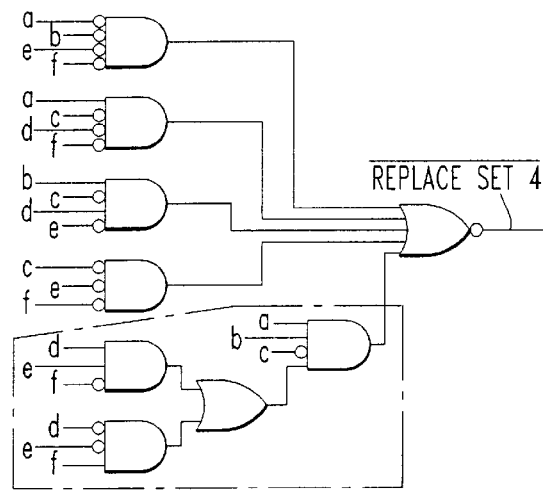
Figure 8D:
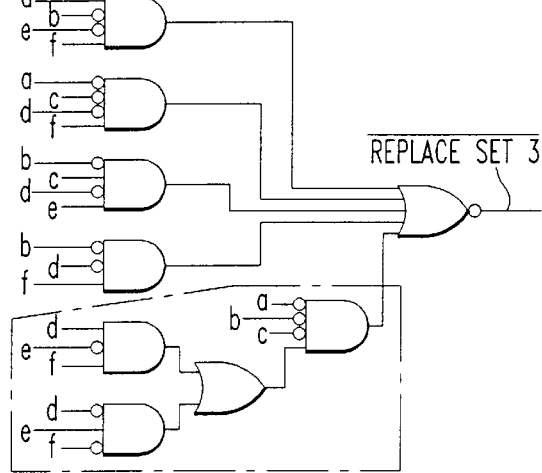
Figure 8B:
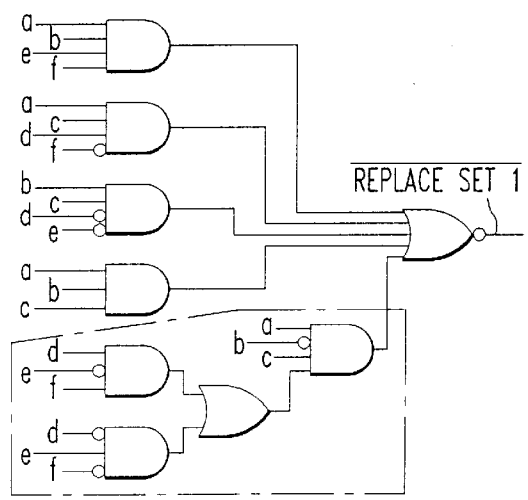
Figure 8E:
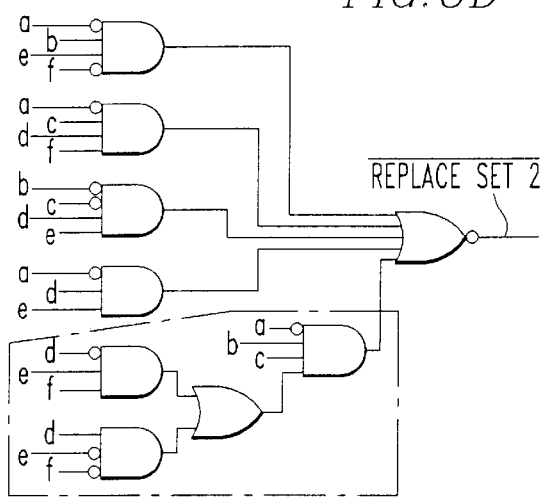

FIG. 7 is a block diagram illustrating an alternative embodiment of the present invention having set replace logic which incorporates error detection and random replacement upon detection of an error. Comparing FIG. 7 to FIG. 4, it is seen that the only gates from the first module 83 which are used in FIG. 7 are gates 67 and 71. Similarly, modules 84, 85, and 86 are also reduced to two gates as shown in FIG. 7. The output from the first gate in each of the modules 83, 84, 85, and 86 is input to an AND gate 88. The output of AND gate 88 is an error signal indicating that an error has occurred. The error signal is input to a random number generator 90 which randomly selects one of sets 1 through 4 to be replaced. The random number generator is connected to each of the second gates in modules 83, 84, 85, and 86 so that the output of the random number generator may be used to effect set replacement. The error signal produced by the AND gate 88 may be used to implement various other responses.

While FIG. 7 may be viewed as a circuit having fault detection and recovery, FIGS. 8A, 8B, 8C, 8D and 8E are a block diagram illustrating an alternative embodiment for the set replacement logic of the present invention which is implemented in a fault tolerant manner. If a Carnaugh map of the logic for each set is drawn, there are four functions (sets 1–4) of six variables. The six variables have sixty four possible states, of which only twenty four are used when the set logic and memory array function properly. For the forty invalid states, eight are already covered by the logic, twenty four uniquely point to only one possible set if it were only a single-bit error, and eight states could have been the product of the single-bit error of three different sets, i.e., all we know for sure is that one of the sets is ruled out, otherwise we cannot tell which of the three sets is most likely. FIGS. 8A–8E represent a minimum logic implementation necessary to take care of the sets that are clearly indicated and a logical grouping of the ones that are "guesses". In FIGS. 8A–8E, the logic shown in the dotted boxes is the logic which is added to cover the eight states of uncertain set likelihood, providing full single bit fault tolerant operation. The net result of the added logic is that one set is always indicated regardless of the presence of an error in the LRU memory array. Clearly, different logic configurations can be obtained by selecting different sets on the Carnagh map, i.e., by making different assumptions concerning the eight states of uncertainty.

The present invention is also directed to a method of controlling which set of a four-way set associated cache memory receives data for storage. The method is comprised of the steps of generating six bits of information representative of the relative use of the four sets within a single access cycle. The information is stored in a memory array within the single access cycle. The information is read from the memory array and output signals are produced from the read information. The output signals are used to control write drivers to thereby control into which of four sets data is to be written.

More specifically, the method of the present invention contemplates reading the tag data and determining if there is a hit. If there is a hit, the LRU bits are updated, i.e., a write is performed. The WAY information is output as a result of the HIT signal. No output of tag data is required. If there is a miss, the LRU bits are read and the WAY signal is output so that the set to be replaced can be read from the cache data RAM if it is a write back cache. Otherwise, the set to be replaced is discarded. Tag data is output to facilitate storing cache data to the correct address.

The present invention provides correct identification, 100%. of the time during no-fault conditions and maximizes correct identification during single-bit fault conditions, of the least recently used set. The present invention is implemented using only six bits of information and a minimum of gates. The logic gates are equally loaded in most embodiments and the logic circuits are structured so that generation and writing of the six bits occurs within a single access cycle so that the speed of the cache system is not compromised. The present invention also provides for error recognition and a mechanism for selecting one of the sets to be replaced in the event of an error. Finally, the present invention may be implemented in a fault tolerant manner that avoids the problem of having to detect and respond to errors.

While the present invention has been described in conjunction with preferred embodiments thereof, those of ordinary skill in the art will recognize that many modifications and variations are possible. The foregoing disclosure and the following claims are intended to cover all such modifications and variations.

What I claim is:

1. A circuit for controlling which set of a multi-way set associative cache memory receives data for storage, comprising:

a memory array for storing at least six bits of information representative of the relative use of the sets within the cache memory;

a first logic circuit for generating said at least six bits of information and for writing said information to said memory array in a single access cycle; and a second logic circuit for reading information from said memory array and for producing output signals therefrom, said output signals indicating into which of the sets data is to be written, wherein the number of ways is four, and wherein said first logic circuit includes a plurality of devices interconnected to generate said at least six bits of information, and wherein:

a first bit indicates if a first set is more recently used than a second set, a second bit indicates if said first set is more recently used than a third set, a third bit indicates if said first set is more recently used than a fourth set, a fourth bit indicates if said second set is more recently used than said third set, a fifth bit indicates if said second set is more recently used than said fourth set, and a sixth bit indicates if said third set is more recently used than said fourth set.

2. The circuit of claim 1 wherein said first logic circuit writes:

said first bit when one of said first set and said second set generates a hit, said second bit when one of said first set and said third set generates a hit, said third bit when one of said first set and said fourth set generates a hit, said fourth bit when one of said second set and said third set generates a hit, said fifth bit when one of said second set and said fourth set generates a hit, and said sixth bit when one of said third set and said fourth set generates a hit.

3. The circuit of claim 2 wherein said plurality of devices includes a plurality of logic gates each responsive to hits generated by two of said sets, and a plurality of write drivers, each write driver being responsive to a hit generated by one of said sets and being controlled by one of said plurality of logic gates.

4. A circuit for controlling which set of a multi-way set associative cache memory receives data for storage, comprising:

a memory array for storing at least six bits of information representative of the relative use of the sets within the cache memory;

a first logic circuit for generating said at least six bits of information and for writing said information to said memory array in a single access cycle; and a second logic circuit for reading information from said memory array and for producing output signals therefrom, said output signals indicating into which of the sets data is to be written, wherein the number of ways is four, and wherein said second logic circuit includes a plurality of gates responsive to said memory array for producing four output signals, a first output signal indicative of when data is to be written to a first set, a second output signal indicative of when data is to be written to a second set, a third output signal indicative of when data is to be written to a third set, and a fourth output signal indicative of when data is to be written to a fourth set.

5. A circuit for controlling which set of a multi-way set associative cache memory receives data for storage, comprising:

memory means for storing at least six bits of information representative of the relative use of the sets within the cache memory;

first logic circuit means for generating said at least six bits of information and for writing said information to said memory means in a single access cycle; and second logic circuit means for reading information from said memory means and for producing output signals therefrom, said output signals indicating into which of the sets data is to be written, wherein the number of ways is four, and wherein said first logic circuit means includes a plurality of devices interconnected to generate said six bits of information, and wherein:

a first bit indicates if a first set is more recently used than a second set, a second bit indicates if said first set is more recently used than a third set, a third bit indicates if said first set is more recently used than a fourth set, a fourth bit indicates if said second set is more recently used than said third set, a fifth bit indicates if said second set is more recently used than said fourth set, and a sixth bit indicates if said third set is more recently used than said fourth set.

6. The circuit of claim 5 wherein said first logic circuit means writes:

said first bit when one of said first set and said second set generates a hit, said second bit when one of said first set and said third set generates a hit, said third bit when one of said first set and said fourth set generates a hit, said fourth bit when one of said second set and said third set generates a hit, said fifth bit when one of said second set and said fourth set generates a hit, and said sixth bit when one of said third set and said fourth set generates a hit.

7. The circuit of claim 6 wherein said plurality of devices includes a plurality of logic gates each responsive to hits generated by two of said sets, and a plurality of write drivers, each write driver being responsive to a hit generated by one of said sets and being controlled by one of said plurality of logic gates.

8. A circuit for controlling which set of a multi-way set associative cache memory receives data for storage, comprising:

memory means for storing at least six bits of information representative of the relative use of the sets within the cache memory;

first logic circuit means for generating said at least six bits of information and for writing said information to said memory means in a single access cycle; and second logic circuit means for reading information from said memory means and for producing output signals therefrom, said output signals indicating into which of the sets data is to be written, wherein the number of ways is four, and wherein said second logic circuit means includes a plurality of gates responsive to said memory means for producing four output signals, a first output signal indicative of when data is to be written to a first set, a second output signal indicative of when data is to be written to a second set, a third output signal indicative of when data is to be written to a third set, and a fourth output signal indicative of when data is to be written to a fourth set.

9. A cache tag circuit, comprising:

a memory array partitioned into a four-way set associative cache and for storing at least six bits of information representative of the relative use of said four sets;

a first logic circuit for generating said at least six bits of information and for writing said information to said memory array in a single access cycle;

a second logic circuit for reading said at least six bits of information from said memory array and for producing output signals therefrom, said output signals indicating into which of said four sets data is to be written;

a write circuit, responsive to said output signals, for writing address information to said memory array; and a read circuit for reading said address information from said memory array, said first logic circuit being responsive to said read circuit, wherein said first logic circuit includes a plurality of devices interconnected to generate said at least six bits of information, and wherein:

a first bit indicates if a first set is more recently used than a second set, a second bit indicates if said first set is more recently used than a third set, a third bit indicates if said first set is more recently used than a fourth set, a fourth bit indicates if said second set is more recently used than said third set, a fifth bit indicates if said second set is more recently used than said fourth set, and a sixth bit indicates if said third set is more recently used than said fourth set.

10. The circuit of claim 9 wherein said first logic circuit writes:

said first bit when one of said first set and said second set generates a hit, said second bit when one of said first set and said third set generates a hit, said third bit when one of said first set and said fourth set generates a hit, said fourth bit when one of said second set and said third set generates a hit, said fifth bit when one of said second set and said fourth set generates a hit, and said sixth bit when one of said third set and said fourth set generates a hit.

11. The circuit of claim 10 wherein said plurality of devices includes a plurality of logic gates each responsive to hits generated by two of said sets, and a plurality of write drivers, each write driver being responsive to a hit generated by one of said sets and being controlled by one of said plurality of logic gates.

12. The circuit of claim 11 wherein said plurality of logic gates include OR gates.

13. A cache tag circuit, comprising:

a memory array partitioned into a four-way set associative cache and for storing at least six bits of information representative of the relative use of said four sets;

a first logic circuit for generating said at least six bits of information and for writing said information to said memory array in a single access cycle;

a second logic circuit for reading said at least six bits of information from said memory array and for producing output signals therefrom, said output signals indicating into which of said four sets data is to be written;

a write circuit, responsive to said output signals, for writing address information to said memory array; and a read circuit for reading said address information from said memory array, said first logic circuit being responsive to said read circuit, wherein said second logic circuit includes a plurality of gates responsive to said memory array for producing four output signals, a first output signal indicative of when data is to be written to a first set, a second output signal indicative of when data is to be written to a second set, a third output signal indicative of when data is to be written to a third set, and a fourth output signal indicative of when data is to be written to a fourth set.

14. A method of controlling, in a single access cycle, which set of a multi-way set associative cache memory receives data for storage, comprising the steps of:

generating at least six bits of information representative of the relative use of the sets within the cache memory;

storing the generated bits of information in a memory array;

reading the stored information from the memory array; and producing output signals from the read information, the output signals indicating into which of the sets data is to be written, wherein the number of ways is four, and wherein said step of storing includes the step of writing:

a first bit when one of a first set and a second set generates a hit, a second bit when one of said first set and a third set generates a hit, a third bit when one of said first set and a fourth set generates a hit, a fourth bit when one of said second set and said third set generates a hit, a fifth bit when one of said second set and said fourth set generates a hit, and a sixth bit when one of said third set and said fourth set generates a hit.

15. A method of controlling, in a single access cycle, which set of a multi-way set associative cache memory receives data for storage, comprising the steps of:

generating at least six bits of information representative of the relative use of the sets within the cache memory;

storing the generated bits of information in a memory array;

reading the stored information from the memory array; and producing output signals from the read information, the output signals indicating into which of the sets data is to be written, wherein the number of ways is four, and wherein said step of producing output signals includes the step of producing four output signals, a first output signal indicative of when data is to be written to a first set, a second output signal indicative of when data is to be written to a second set, a third output signal indicative of when data is to be written to a third set, and a fourth output signal indicative of when data is to be written to a fourth set.

* * * * *

UNITED STATES PATENT AND TRADEMARK OFFICE
CERTIFICATE OF CORRECTION

PATENT NO : 5,845,320
DATED : December 1, 1998
INVENTOR(S): J. Thomas Pawlowski

It is certified that error appears in the above-identified patent and that said Letters Patent is hereby corrected as shown below:

Column 7, line 65, delete --.-- after 100%

Signed and Sealed this

Ninth Day of November, 1999

Attest:

Q. TODD DICKINSON

Attesting Officer

Acting Commissioner of Patents and Trademarks